United States Patent [19]

Atkins

[11] Patent Number: 4,600,844
[45] Date of Patent: Jul. 15, 1986

[54] LIQUID LEVEL CONTROL APPARATUS
[75] Inventor: Donald G. Atkins, Cedar, Minn.
[73] Assignee: The Marley-Wylain Company, Mission Woods, Kans.
[21] Appl. No.: 617,957
[22] Filed: Jun. 7, 1984
[51] Int. Cl.$^4$ .......................................... H01H 35/18
[52] U.S. Cl. .................................. 307/118; 340/620; 361/178; 137/392
[58] Field of Search ................ 307/118, 116; 361/178; 340/620; 364/509, 510; 137/392, 395, 396

[56] References Cited

U.S. PATENT DOCUMENTS

| | | | |
|---|---|---|---|
| 3,787,733 | 1/1974 | Peters | 307/118 |
| 3,894,240 | 7/1975 | Rose | 250/577 |
| 3,908,133 | 9/1975 | Hartley | 307/118 |
| 3,916,213 | 10/1975 | Luteran | 307/118 |
| 3,978,352 | 8/1976 | Rose | 307/308 |
| 4,061,442 | 12/1977 | Clark et al. | 417/36 |
| 4,205,237 | 5/1980 | Miller | 307/118 |
| 4,244,385 | 1/1981 | Hotine | 307/118 X |
| 4,265,262 | 5/1981 | Hotine | 307/118 X |
| 4,371,790 | 2/1983 | Manning et al. | 307/118 |
| 4,382,382 | 5/1983 | Wang | 73/304 R |
| 4,404,809 | 9/1983 | Johnson et al. | 137/392 X |

Primary Examiner—A. D. Pellinen
Assistant Examiner—T. DeBoer
Attorney, Agent, or Firm—Merchant, Gould, Smith, Edell, Welter & Schmidt

[57] ABSTRACT

A circuit for controlling the level of a liquid in a tank between predetermined limits is disclosed. A low and high probe are provided, each connected in the tank at the desired limit levels, and each connected to a comparator associated therewith. The output of each of the comparators are connected as inputs to an OR gate, which provides the control signal for activating a pump to pump liquid from the tank, and further provides a latching signal to the lower limit comparator, to keep that comparator latched in an off position until the upper limit comparator is triggered by liquid coming into contact with the upper limit probe. Once activated, the upper limit comparator causes the OR gate to produce a pump activation signal, in addition to unlatching the lower limit comparator, which in turn produces an OR gate activating signal which remains set until the pump evacuates the tank below the level of the lower limit probe, thereby deactivating the OR gate and the pump and whereby the process may be reinitiated.

6 Claims, 2 Drawing Figures

LIQUID LEVEL CONTROL APPARATUS

TECHNICAL FIELD OF THE INVENTION

The present invention relates generally to the field of liquid level control, and more specifically to a system for maintaining the level of a liquid in a tank between predetermined limits.

BACKGROUND OF THE INVENTION

It is often desirable to control the level of a liquid in a sump or water tank, such that a pump is activated when the liquid rises above a predetermined level and deactivated when the liquid falls beneath a second predetermined level. There are numerous level control systems in the prior art, many of which utilize mechanical or moving parts such as rubber diaphragms, springs, rods, floats or balls which parts have a tendency to wear out or malfunction. Other prior art systems operate on electrical or optical principles, in which electrical or optical probes are positioned in the tank and used to sense the level of liquid therein, and thereby control a liquid pump. However, such prior art systems are sensitive to humidity and moisture, and in addition to voltage levels in the sensing circuit, such that they often need to be adjusted and may produce erroneous control signals under certain conditions.

The present invention substantially reduces or eliminates such problems by providing a solid state electronic sensing and control system which has no mechanical or moving parts and which operates on simple and electrically predictable principles.

SUMMARY OF THE INVENTION

The present invention provides a control circuit for maintaining a medium between predetermined limits in a system including medium control means operable when energized to vary the medium from one limit toward another limit. The circuit includes first and second limit probes for detecting the medium at first and second limits respectively and producing first and second limit sense signals respectively. A first limit comparator means is provided and is connected at an input to said first limit probe means and is responsive to said first limit sense signal to produce a first control signal. A second limit comparator means is provided and is connected at one input to said second limit probe means and is selectively responsive to said second limit sense signal to produce a second control signal. The second limit comparator means includes means responsive to a latching signal to maintain the second control signal in its present condition. Logic means is provided and receives the first and second control signals to produce a medium control means energizing signal in response to the presence of either, and is further responsive to a transition in said second control signal to produce the latching signal until the first control signal is present.

According to one aspect of the invention the medium to be varied comprises a liquid, and the medium control means includes a pump operable when energized to pump liquid from a vessel containing the liquid, and the first and second limit probe means comprise upper and lower limit probes for detecting the medium at upper and lower limits in the vessel respectively and producing upper and lower limit sense signals respectively. Also, the first and second limit comparator means comprise upper and lower limit comparators connected respectively to said upper and lower limit probes.

According to yet another aspect of the invention, the logic means comprises an OR gate receiving said first and second control signals, and said control means energizing signal output therefrom is applied to a resistor network to produce said latching signal.

According to still another aspect of the invention the upper and lower limit probe means comprise electrical probes mounted inside a vessel containing the liquid to be controlled to detect the presence of the liquid by sensing an electrical path from the probe and through the liquid to the vessel.

Thus, the present invention provides a simple and electrically predictable control circuit for maintaining a medium between predetermined limits, as more specifically shown and described in the ensuing specification and drawing.

DETAILED DESCRIPTION OF THE INVENTION

Figure 1:
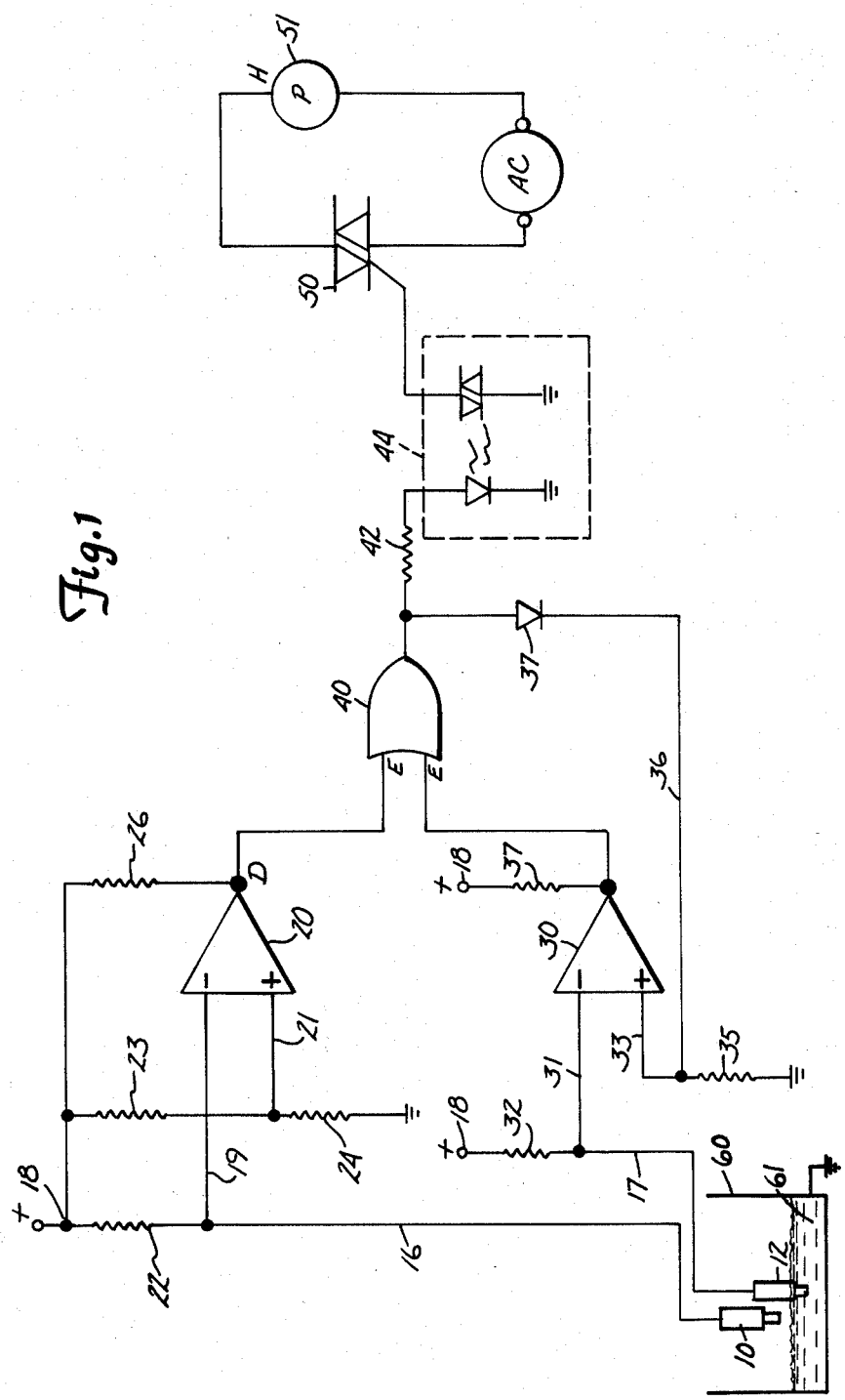
FIG. 1 is a schematic block diagram of the liquid level sensor according to the present invention.

Referring to FIG. 1, there is shown in block diagrammatic form a liquid level sensor according to the present invention. First and second probes 10 and 12 are provided, and are designed for mounting inside a tank 60 in which the liquid level is sought to be controlled, with probe 10 mounted in the tank at the level at which it is sought to keep the liquid 61 below and with probe 12 mounted in the tank at the level at which it is sought to keep the liquid above. Insulated conductors 16 and 17 connect probes 10 and 12 respectively to the electrical components of the electronic control circuitry of the present invention, which is to be mounted outside the tank in a substantially dry environment.

The control circuit includes an upper limit comparator 20 which is electrically connected to probe 10 through conductor 16 at its inverting input terminal 19, which is connected through resistor 22, preferably 1 (one) megohm, to a positive potential 18, which is preferably 12 volts. The noninverting input terminal 21 of comparator 20 is also connected to positive potential 18, through a first resistor 23, and additionally connected through a second resistor 24 to a system ground, to which the tank and potential 18 are also grounded. Thus, resistors 23 and 24 provide a divider which produces a switching-point reference voltage at terminal 21 of the noninverting input to comparator 20. The output of comparator 20, which is an open collector, in the preferred embodiment, is also connected to potential 18, through a suitable pull-up resistor 26 and also to the input of OR gate 40. As is commonly known in the art, the output of a differential voltage comparator will remain low as long as the voltage on the inverting input exceeds the voltage on the noninverting input. In the case of an open collector comparator, pull-up resistors are required for proper operation.

A lower limit comparator 30 also of open collector output design is provided, and has connected to its inverting input terminal 31 conductor 17, with terminal 31 being further connected through a resistor 32, preferably around 3 (three) megohms, to positive potential 18. The noninverting input terminal 33 of comparator 30 is connected through a resistor 35 to ground, and through a conductor 36 and diode 37 to the output of OR gate 40. The output of comparator 30 is biased to positive potential 18 through a resistor 37, and further connected to provide the second input to OR gate 40.

The output of OR gate 40 is connected through a resistance 42 to an opto-coupler or switch 44, which provides an input to triac 50. Triac 50 is connected in a circuit with a water pump 51, provided to pump liquid from the tank in which probes 10 and 12 are located, and with an alternating current power supply, for example 110 volts.

OPERATION

Figure 2:
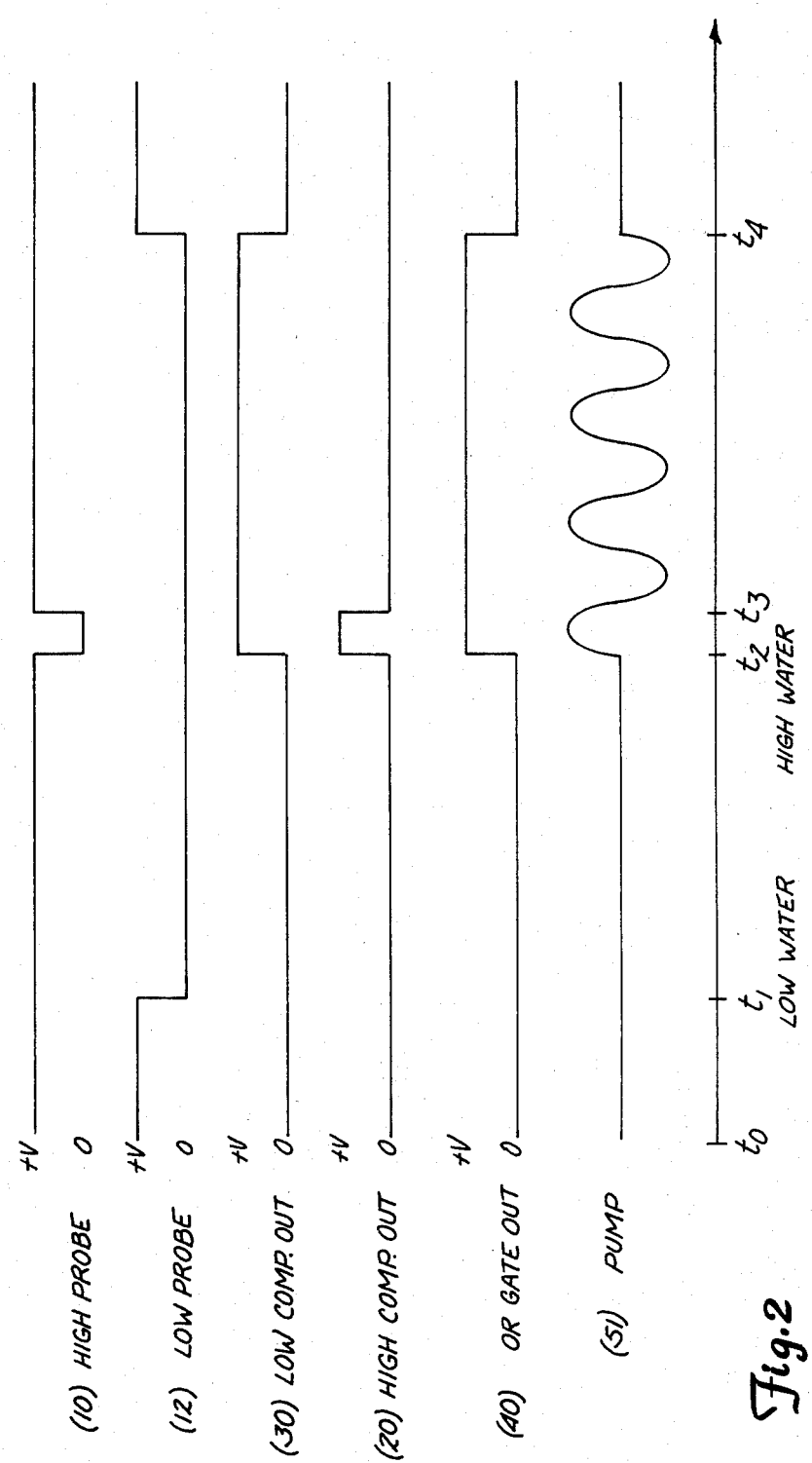
FIG. 2 is a logic diagram of the operation of the circuit of FIG. 1.

Referring now to FIG. 2, which is a logic diagram, the operation of the circuit of FIG. 1 will now be explained. Assuming first that at the time $t_0$ the liquid in the tank is at a level lower than the low level probe 12, probes 10 and 12 and conductors 16 and 17 are at high logic levels by virtue of bias resistors 22 and 32, and the outputs of low level comparator 30, high level comparator 20, and OR gate 40 are at low logic levels. Put another way the open collector outputs of, comparators 20 and 30 are in an activated condition, and hence pull the open collector outputs low by virtue of the fact that their respective inverting input terminals 19 and 31 are biased at a voltage level higher than their respective noninverting inputs 21 and 33, with OR gate 40 deactivated. By virtue of the low level output from OR gate 40, switch 44 is also deactivated, maintaining triac 50 and pump 51 in a deactivated condition.

At a time $t_1$, the liquid in the tank has risen to the level of low probe 12, which in turn introduces a near ground voltage on the inverting input terminal 31 of low level comparator 30, by virtue of the fact that the tank is grounded and the conductive path of the liquid to the tank ground. However, due to diode 37 and resistance 35 the noninverting input terminal 33 of comparator 30 is maintained at a voltage level sufficiently low enough to keep the open collector output transistor of comparator 30 maintained or "latched" in an activated condition with the output held to a low level, such that apart from the transition of the low probe 12 voltage level from a positive potential to ground, no other changes occur in the circuit, and pump 51 remains deactivated.

At a time $t_2$, the liquid in the tank has reached the level of high probe 10, causing that probe's potential to transition from a positive potential to a near ground potential which is sufficiently less than the reference voltage existing on terminal 21 to switch the open collector output transistor of comparator 20 to a deactivated condition, whereby the comparator output rises to a high logic state as provided for by bias resistor 26 and potential 18. Contemporaneously with the transition of the output of comparator 20 from a low to a high state, the output of OR gate 40 switches to a high voltage or on condition, thereby activating switch 44 and triac 50, to cause AC power to be delivered to pump 51, which in turn begins to pump liquid from the tank. The output of OR gate 40 further acts through diode 37 and conductor 36 to pull the voltage level on terminal 33 of comparator 30 high, above the level of voltage on terminal 31, and thereby cause the open collector output transistor of comparator 30 to be switched to a deactivated condition, and permit the voltage level thereon to be pulled up through resistance 37 to approximately the value of potential 18, and thereby provide a logic "one" to the lower input of OR gate 40.

Thus, from the time $t_2$ to the time $t_3$, both high and low comparators 20 and 30 respectively apply a logic "one" high voltage to the input of OR gate 40, maintaining the pump 51 in an activated condition. At time $t_3$, pump 51 sufficiently evacuates the tank such that the water level recedes below the level of high probe 10, whereby the voltage level of that probe again rises to the bias provided by potential 18 causing the open collector output transistor of comparator 20 to switch to an active condition which causes the output of comparator 20 to be pulled low, and thereby apply a low voltage or logic "zero" input signal to OR gate 40. However, the open collector output transistor of low comparator 30 remains in a deactivated condition with its output biased to the positive potential, so that the output of OR gate 40 remains on and pump 51 remains activated.

When the liquid level in the tank finally recedes below the level of low probe 12 at a time $t_4$, the input to comparator 30 at its inverting terminal 31 rises back to its initial high voltage condition, which is higher than the high reference voltage applied to its noninverting terminal 33 by OR gate 40 so that the open collector output transistor of comparator 30 is activated and its output driven low. Contemporaneously, OR gate 40, its inputs now both at a low logic level, switches to a low level output voltage condition, thereby terminating the application of power to pump 51 via triac 50, and accordingly latching comparator 30 in an activated condition as it existed from time $t_0$ to $t_2$ as described above.

Thus, there has been described an electrical probe and circuit system for controlling a pump to maintain a liquid in a tank between predetermined limits. However, while the circuit has been shown and described suggesting certain resistor values, comparators with open collector outputs and an OR gate, it shall be understood that any equivalent components and logic performing the same function may be employed, as those skilled in the art will readily recognize. Moreover, it shall also be understood that the output of the control circuit, i.e. the output of OR gate 40 in the above described embodiment, may be implemented to control any conventional pump energizing circuit, for example a relay or solenoid, as are also well known expedients for that purpose. Still further, it shall be understood that the control circuit of the present invention has applications other than in the field of liquid level control, and may be applied generally whenever it is desired to maintain any medium between two predetermined limits, subject only to modifications in the probe design.

While the present invention has been described in its preferred form, it will be readily apparent to those skilled in the art that many changes or modifications could be made thereto without departing from the spirit and scope of the invention as set forth in the claims appended hereto.

What is claimed is:

1. Apparatus controlling a liquid between predetermined levels in a grounded vessel comprising:

pumping means operable when energized to pump the liquid from the grounded vessel;

upper and lower limit single conductor electrical probes mountable in the vessel at upper and lower limit levels respectively, said probes producing upper and lower limit sense signals respectively when the liquid is sensed at the respective level;

an upper limit comparator connected at one input thereof to said upper limit probe, said upper limit comparator responsive to said upper limit sense signal and a fixed reference signal connected at a second input thereof to produce a first control signal in reponse to the difference between said fixed reference signal and said upper limit sense signal;

a lower limit comparator connected at one input thereof to said lower limit probe and selectively responsive to said lower limit sense signal and a variable reference signal connected at a second input thereof to produce a second control signal; and OR gate means receiving said first and second control signals for producing a control means energizing signal in response to the presence of either control signal, and further responsive to the absence of both control signals to vary said variable reference signal to prevent said lower limit comparator from producing said second control signal until said first control signal is present to permit the liquid to fill said vessel from below said lower limit to said upper limit and to cause said pumping means to empty said liquid from said vessel down to below said lower limit.

2. A control circuit controlling a medium between predetermined upper and lower limits in a system including medium control means operable to vary said medium at least from said upper limit below said lower limit, said circuit comprising:

upper and lower limit single conductor electrical probes operable to detect the presence of said medium at upper and lower limits respectively;

upper and lower limit differential comparator means connected at an input to said upper and lower limit probes respectively, producing upper and lower limit signals respectively when said medium is detected by said probes; p1 logic means receiving said upper limit signal and producing a control signal in response thereto, said control signal used to cause said medium control means to vary said medium toward said lower limit;

reference voltage control means supplying a first reference voltage to a second input of said lower limit comparator in the absence of said control signal to prevent said lower limit comparator from producing said lower limit signal and operable in response to said control signal to vary said first reference voltage to permit said lower limit comparator to produce said lower limit signal when the presence of the medium is detected by said lower limit probe; and said logic means further receiving said lower limit signal and further responsive thereto to produce said control signal whereby said medium is automatically maintained below said upper limit.

3. A control circuit controlling a conductive medium between predetermined limits in a system including medium control means operable when energized to vary said medium from an upper limit toward a lower limit, said circuit comprising:

upper and lower limit single conductor electrical probes biased to a predetermined voltage contacting the medium at upper and lower limits respectively whereby the voltage on the contacting probe varies;

upper limit differential comparator means connected at an input to said upper limit probe and responsive to the variance of the voltage thereon away from said predetermined voltage to produce a first control signal;

lower limit differential comparator means connected at an input to said lower limit probe and responsive to the variance of the voltage thereon away from said predetermined voltage and further responsive to a latching signal applied at the other input to produce a second control signal; and logic means receiving said first and second control signals for producing a control means energizing signal in response to the presence of either control signal, and further responsive to the transition from the presence to the absence of said second control signal to produce said latching signal until said first control signal is present to permit said medium to vary from below said lower limit to said upper limit and to cause said medium control means to vary said medium from said upper limit to said lower limit.

4. A control circuit, controlling a conductive liquid medium between predetermined upper and lower limits in a grounded vessel in a system including medium control means operable to vary said medium at least from said upper limit to below said lower limit, said circuit comprising:

upper and lower limit single conductor electrical probes operable to detect the presence of said medium at upper and lower limits respectively by sensing an electrical path between the probe and the grounded vessel;

upper and lower limit voltage differential comparator means connected at an input to said upper and lower limit probes respectively, producing upper and lower limit signals respectively when said medium is detected by said probes;

logical OR means receiving said upper limit signal and said lower limit signal and producing a control signal in response thereto for enabling said medium control means to vary said medium toward said lower limit; and variable reference voltage control means supplying a first reference voltage to a second input of said lower limit comparator in the absence of said control signal to prevent said lower limit comparator from producing said lower limit signal and operable in response to said control signal to vary said first reference voltage to a second reference voltage to permit said lower limit comparator to produce said lower limit signal when the presence of the medium is detected by said lower limit probe.

5. The circuit according to claim 4 wherein said control signal is optically coupled to said medium control means.

6. A control circuit controlling a conductive liquid medium between predetermined upper and lower limits in a grounded vessel in a system including medium control means operable to vary said medium at least from said upper limit to below said lower limit, said circuit comprising:

a single conductor upper limit probe operable to detect the presence of said conductive medium at the upper limit by sensing an electrical path between the probe and the grounded vessel;

an upper limit bias resistor connected between said upper limit probe and a voltage potential;

upper limit voltage differential comparator means connected at the inverting input to the upper limit probe and connected at the noninverting input to a fixed reference voltage;

a single conductor lower limit probe operable to detect the presence of said conductive medium at the lower limit by sensing an electrical path between said lower limit probe and said grounded vessel;

lower limit bias resistor connected between said lower limit probe and the voltage potential;

lower limit voltage differential comparator means connected at the inverting input to said lower limit probe and at the noninverting input to a pull-down resistor connected on the other side to a ground potential;

logical OR means receiving said upper limit voltage differential comparator output and lower limit voltage differential comparator output producing a medium control signal used for energizing said medium control means; and said control signal further connected to the noninverting input of said lower limit voltage differential comparator so that said control signal operates to change the reference voltage potential on the inverting input of said lower limit comparator.

* * * * *

UNITED STATES PATENT AND TRADEMARK OFFICE
CERTIFICATE OF CORRECTION

PATENT NO. : 4,600,844
DATED     : July 15, 1986
INVENTOR(S) : Donald G. Atkins

It is certified that error appears in the above-identified patent and that said Letters Patent is hereby corrected as shown below:

Column 5, line 6, "reponse" should be -- response--;

Column 5, line 39, delete "pl" begin hew paragraph with "logic".

Signed and Sealed this

Fourteenth Day of October, 1986

[SEAL]

Attest:

DONALD J. QUIGG

*Attesting Officer*     *Commissioner of Patents and Trademarks*